United States Patent Office 3,283,023
Patented Nov. 1, 1966

3,283,023
POLYMERISATION MODIFIERS
Thomas Aitken, Ipswich, Suffolk, England, assignor to B.X. Plastics Limited, London, England, a British company
No Drawing. Filed Aug. 5, 1963, Ser. No. 300,053
Claims priority, application Great Britain, Aug. 8, 1962, 30,438/62
14 Claims. (Cl. 260—669)

This invention relates to polymerisation modifiers, for example, chain transfer agents, derived from monomeric alpha methyl styrene and to a process for the manufacture of such polymerisation modifiers. The products of the present invention have also the property of retarding polymerisation.

It has been found that monomeric alpha methyl styrene can be polymerised to give a dimeric compound which can exist in at least four isomeric forms. One of these isomers, 1,1,3-trimethyl-3-phenyl indan, contains no olefinically unsaturated bonds and is believed to be substantially inactive as a polymerisation modifier. Three of the other isomers (2,4-diphenyl-4-methyl-1-pentene and cis and trans 2,4-diphenyl-4-methyl-2-pentene) are olefinically unsaturated, but their activities as polymerisation modifiers are thought to be different. Therefore, in the manufacture of an alpha methyl styrene dimer for use as a polymerisation modifier, it is desirable to avoid the formation of the saturated dimer and to form the maximum possible amount of the active last-named isomers.

The present invention is based on the observation that a highly active alpha methyl styrene dimer composition suitable for use as a polymerisation modifier may be obtained by polymerising monomeric alpha methyl styrene in the presence of a catalyst comprising sulphuric acid of certain concentration and in the presence of a surface active agent which forms an emulsion between the sulphuric acid and the monomeric alpha methyl styrene. The process of this invention has also the advantage that the period of reaction can be reduced by the use of a surface active agent as described.

This invention therefore provides a process for the manufacture of an alpha methyl styrene dimer composition wherein an emulsion of dilute sulphuric acid (having a concentration within the range of 30% to 65% by weight) and monomeric alpha methyl styrene is formed in the presence of a surface active agent which is inert under the conditions of the reaction, and the emulsion is heated at a temperature within the range of 15° to 105° C.

Advantageously, the emulsion is heated at a temperature of approximately 50° C.

The ratio by weight of the dilute sulphuric acid to alpha methyl styrene may be within the range of 0.5:1 to 8:1, and preferably within the range of 1:1 to 4:1, more especially within the range of 2:1 to 4:1.

The period during which the emulsion is heated depends upon the quantity and concentration of sulphuric acid and upon the temperature at which the emulsion is heated. The period may be within the range of 1 to 16 hours, and is advantageously about 4 hours.

The concentration of the dilute sulphuric acid is advantageously 50% by weight. The concentration of the surface active agent in the emulsion may be within the range of 0.001% to 1% by weight of the dilute sulphuric acid, and is preferably about 0.05% by weight of the dilute sulphuric acid.

The surface active agent may be a member of the group of substances indicated by the general formula

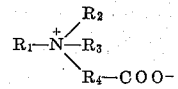

in which $R_1$ is an alkyl group containing from 8 to 18 carbon atoms, and $R_2$, $R_3$ and $R_4$ are each substituted or unsubstituted alkyl groups containing from 1 to 7 carbon atoms.

The high activity of the alpha methyl styrene dimer composition of the present invention is believed to be due to it having a high content of olefinically unsaturated isomers.

The following examples illustrate the invention:

EXAMPLE 1

800 grams of dilute sulphuric acid having a concentration of 50% by weight (i.e. 400 grams of $H_2SO_4$ and 400 grams of water) were mixed with 200 grams of monomeric alpha methyl styrene in the presence of 0.4 gram of "Ambiteric D," the trade name of a surface active agent having the chemical structure

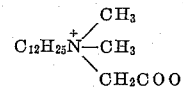

The surface active agents was added to the acid/alpha methyl styrene mixture in the form of a solution of the substance in a little warm water.

The mixture of sulphuric acid and monomeric alpha methyl styrene was stirred to form an emulsion, and the emulsion was heated at 50° C. for 4 hours with stirring. The reaction time and temperature were so chosen that none of the monomeric alpha methyl styrene remained in the emulsion, and therefore no distillation of the resulting organic phase was necessary to separate the monomer from the dimeric products.

This product was then called the "standard product" and was said to have an activity (as defined below) of unity.

A control experiment was also carried out using the same concentration of sulphuric acid and the same quantities of acid and monomer. No surface active agent was added, and it was found that it was necessary to heat the mixture for 30 hours at 50° C. in order that no monomeric alpha methyl styrene remained in the product. The activity of the product was found to be 0.82.

The activity of the product obtained after only 4 hours' reaction was 0.54.

The measurements of activity were carried out as follows: Two samples of methylmethacrylate monomer were polymerised in the presence of lauroyl peroxide as a catalyst and under carefully controlled conditions, one sample containing the standard polymerisation modifier and the other containing the same quantity of the polymerisation modifier the activity of which was to be measured.

The degree of polymerisation (as indicated by the refractive index of the sample) was arranged to be the same for each sample by adjusting the reaction conditions accordingly. The activity of a polymerisation modifier is a function of the molecular weight of the polymeric product: the higher the activity, the smaller will be the average molecular weight of the polymer. Hence the activities were compared by measuring the time of fall (over a selected distance) of a steel sphere of ⅛" diameter through a portion of each sample maintained at 25° C., since the viscosity of the polymer, and hence the time of fall, will increase if the molecular weight of the polymer is increased. The activity of a product was defined as:

$$\frac{\text{Time of fall of ball in sample of standard product}}{\text{Time of fall of ball in sample of test product}}$$

EXAMPLES 2 TO 15

Each of Examples 2 to 15 was conducted in a 2 litre flask, and the reaction was allowed to proceed for a period which resulted in almost 100% conversion of the monomeric alpha methyl styrene to the dimer composition. The amount of conversion was shown by the change in the refractive index of the alpha methyl styrene, the refractive index tending towards an asymptotic limit as the period of reaction increased.

In each of Examples 2 to 15, an emulsion of monomeric alpha methyl styrene and dilute sulphuric acid was produced by stirring in the presence of the surface active agent used in Example 1. The process conditions are as indicated in Table 1 below. The "effective dimer concentration" (EDC) of the product was estimated by comparing the product against an arbitrary standard product, and is expressed in the same units as those used in Example 1, with the standard product described in Example 1 having an EDC value of unity. An analysis of the product by gas-liquid chromatography showed four peaks, referred to in Table 1 below as peaks 1 to 4 in order of increasing retention time during analysis. The active constituents of a dimer composition which is used as a polymerisation modifier probably give rise to peaks 2 and 3, although it is at present not known which dimer gives rise to a particular peak. The figures in Table 1 under the heading "GLC analysis" (gas-liquid chromatography analysis) show the percentage of each peak in the chromatogram.

Unless otherwise stated in Table 1, the reaction conditions of the process were as follows:

| | |
|---|---|
| Acid concentration | 50% by weight. |
| Temperature | 70° C. |
| Stirrer speed | 300 revolutions per minute. |
| Ratio by weight of dilute sulphuric acid to monomeric alpha methyl styrene | 4:1. |
| Concentration of surface active agent | 0.01% by weight, on weight of adilute sulphuric acid. |

EXAMPLE 16

An emulsion of 4 parts by weight of dilute sulphuric acid having a concentration of 50% by weight and 1 part by weight of monomeric alpha methyl styrene was formed in a 1 gallon reaction vessel in the presence of the surface active agent used in Example 1, the concentration of the surface active agent being 0.05% by weight based on the weight of the dilute sulphuric acid. The reaction was carried out at a temperature of 50° C., whilst stirring the emulsion, the stirrer speed being 200 revolutions per minute. The process was continued until the organic layer had a refractive index, at 25° C., of 1.5640±0.0001. Five batches were prepared, the aqueous phase containing the acid and surface active agent being separated from the organic phase and used again for the next batch.

The overall recovery of organic material was 97% by weight, and the overall yield, after working-up the product by passing it through a column consisting of a mixture of alumina and anhydrous sodium carbonate, was 91% by weight.

The results of the five runs are summarized in Table 2.

Table 2

| Run Number | Reaction time (hr.) | Refractive Index (25°) | EDC | GLC Analysis | | |
|---|---|---|---|---|---|---|
| | | | | Peak 1 | Peaks 2 and 3 | Peak 4 |
| 1 | 4.7 | 1.5640 | 1.13 | 1 | 92 | 7 |
| 2 | 4.3 | 1.5639 | 1.15 | 3 | 91 | 6 |
| 3 | 4.3 | 1.5640 | 1.13 | 1 | 93 | 6 |
| 4 | 4.2 | 1.5641 | 1.09 | 2 | 93 | 5 |
| 5 | 4.4 | 1.5640 | 1.10 | 3 | 91 | 6 |

I claim:
1. A process for the manufacture of an α-methyl styrene dimer composition, which comprises forming an emulsion of dilute sulphuric acid having a concentration within the range of 30 to 65% by weight and monomeric α-methyl styrene in the presence of a surface active agent which is inert under the reaction conditions and is a compound of the general formula

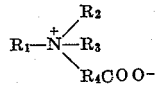

in which $R_1$ is an alkyl group containing from 8 to 18 carbon atoms and $R_2$, $R_3$ and $R_4$ are each substituted or unsubstituted alkyl groups containing from 1 to 7 carbon

Table 1

| Example | Variable Reaction Condition | Reaction time (hours) | EDC value | GLC analysis | | |
|---|---|---|---|---|---|---|
| | | | | Peak 1 | Peaks 2 and 3 | Peak 4 |
| | Acid concentration by weight: | | | | | |
| 2 | 60 | 4.0 | .80 | 13 | 71 | 16 |
| 3 | 50 | 10.5 | .94 | 3 | 86 | 11 |
| 4 | 40 | 39.0 | 1.00 | 1 | 88 | 11 |
| | Temperature: | | | | | |
| 5 | 80° C. | 5.0 | .90 | 5 | 81 | 14 |
| 6 | 70° C. | 10.5 | .94 | 3 | 86 | 11 |
| 7 | 60° C. | 12.0 | | 3 | 90 | 7 |
| | Stirrer speed revo./min.: | | | | | |
| 8 | 200 | 14.2 | .94 | 3 | 81 | 16 |
| 9 | 300 | 10.5 | .94 | 3 | 86 | 11 |
| 10 | 500 | 4.7 | 1.01 | .2 | 87 | 11 |
| | Phase ratio aqueous/organic: | | | | | |
| 11 | 2:1 | 20 | .86 | 3 | 84 | 13 |
| 12 | 4:1 | 10.5 | .94 | 3 | 86 | 11 |
| 13 | 6:1 | 9.2 | .93 | 3 | 90 | 7 |
| | Conc. of surface active agent: | | | | | |
| 14 | 0.01% | 10.5 | .94 | 3 | 86 | 11 |
| 15 | 0.10% | 2.0 | 1.01 | 2 | 91 | 7 |
| Control | 0 | 15.2 | .66 | 12 | 64 | 24 | atoms, and heating the emulsion to a temperature within the range of 15° C. to 105° C.

2. A process as claimed in claim 1, wherein the ratio by weight of the dilute sulphuric acid to the monomeric α-methyl styrene is within the range of from 0.5:1 to 8:1.

3. A process as claimed in claim 1, wherein the ratio by weight of the dilute sulphuric acid to the monomeric α-methyl styrene is within the range of 1:1 to 4:1.

4. A process as claimed in claim 1, wherein the ratio by weight of the dilute sulphuric acid to the monomeric α-methyl styrene is within the range of 2:1 to 4:1.

5. A process as claimed in claim 1, wherein the emulsion is heated for a period within the range of 1 to 16 hours.

6. A process as claimed in claim 1, wherein the emulsion is heated for a period of approximately 4 hours.

7. A process as claimed in claim 1, wherein the emulsion is heated at a temperature of approximately 50° C.

8. A process as claimed in claim 1, wherein the dilute sulphuric acid has a concentration of approximately 50% by weight.

9. A process as claimed in claim 1, wherein the concentration of the surface active agent in the emulsion is within the range of 0.001 to 1% by weight based on the weight of the dilute sulphuric acid.

10. A process as claimed in claim 1, wherein the concentration of the surface active agent in the emulsion is approximately 0.05% by weight based on the weight of dilute sulphuric acid.

11. A process as claimed in claim 1, wherein the surface agent has the formula

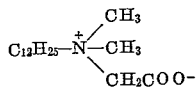

12. A process for the manufacture of an α-methyl styrene dimer composition, which comprises forming an emulsion of dilute sulphuric acid having a concentration within the range of 30 to 65% by weight and monomeric α-methyl styrene, the weight ratio of the dilute sulphuric acid to the monomeric α-methyl styrene being within the range of 0.5:1 to 4:1, in the presence of 0.001 to 1% by weight, based on the dilute sulphuric acid, of a surface active agent which is inert under the reaction conditions and is a compound of the general formula

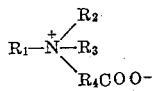

in which $R_1$ is an alkyl group containing 8 to 18 carbon atoms and $R_2$, $R_3$ and $R_4$ are each a substituted or unsubstituted alkyl group containing 1 to 7 carbon atoms, and heating the emulsion to a temperature within the range of 15° C. to 105° C., for a period within the range of 1 to 16 hours.

13. A process for the manufacture of an α-methyl styrene dimer composition, which comprises forming an emulsion of dilute sulphuric acid having a concentration within the range of 30 to 65% by weight and monomeric α-methyl styrene, the weight ratio of the dilute sulphuric acid to the monomeric α-methyl styrene being within the range of 0.5:1 to 4:1, in the presence of 0.001 to 1% by weight, based on the dilute sulphuric acid of a surface active agent which is inert under the reaction conditions and is a compound of the formula

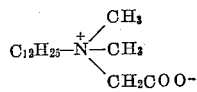

and heating the emulsion to a temperature within the range of 15° C. to 105° C. for a period within the range of 1 to 16 hours.

14. A process for the manufacture of an α-methyl styrene dimer composition, which comprises forming an emulsion of dilute sulphuric acid having a concentration of approximately 50% by weight and monomeric α-methyl styrene in a weight ratio of dilute sulphuric acid to monomeric α-methyl styrene within the range of 2:1 to 4:1 in the presence of a surface active agent which is inert under the reaction conditions and is a compound of the formula

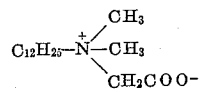

in a proportion of approximately 0.05% by weight of the dilute sulphuric acid, and heating the emulsion at a temperature of approximately 50° C. for a period of approximately 4 hours.

References Cited by the Examiner

UNITED STATES PATENTS 2,429,719 10/1947 Hersberger et al. ____ 260—669
3,182,044 5/1965 Messwarb et al. ___ 260—93.5 X DELBERT E. GANTZ, Primary Examiner.

C. R. DAVIS, Assistant Examiner.